UNITED STATES PATENT OFFICE.

JULIUS J. SALTERY, OF BOSTON, MASSACHUSETTS, ASSIGNOR TO JULIUS JUSTUS, OF HANOVER, GERMANY.

MANUFACTURE OF BRIQUETTES.

SPECIFICATION forming part of Letters Patent No. 374,560, dated December 6, 1887.

Application filed June 6, 1887. Serial No. 240,452. (No specimens.)

*To all whom it may concern:*

Be it known that I, JULIUS J. SALTERY, a resident of the city of Boston, in the State of Massachusetts, and a citizen of the United States, have invented a certain new and useful Improvement in the Manufacture of Briquettes, of which the following is a specification.

Previous attempts to produce, by the utilization of molasses, briquettes from ores which are either in dust-like condition or in granules of somewhat larger size, for the purpose of treatment in reducing-furnaces, or from small coal, coal-dust, sawdust, &c., for the purpose of producing a useful fuel, have not given satisfactory results, as briquettes made in this manner did not resist the influence of water. As soon as they came accidentally in contact with moisture, or even when they were only exposed to the moist air, they lost their firm consistency and a dissolution took place by degrees. Among other disadvantages the briquettes for these reasons could not be transported in open wagons or on ships.

The object of this invention is by the following process to utilize molasses for the before-mentioned purpose, and experiments which have been made prove that the products thus obtained have not the aforesaid defect.

To the molasses is added, before its being used, linseed-oil—say in the proportion of one to ten. With this mixture the ore, small coal, coal-dust, &c., are moistened without the application of heat, the mass thus prepared being then pressed into forms at a pressure considerably higher than that required in the manufacture of briquettes with tar—up to four hundred and fifty kilograms per square centimeter. The pieces thus produced are then kiln-dried at a temperature of 200° to 250° centigrade—not merely dried in the air, as is done when when molasses without the addition of linseed-oil is used. During this kiln-drying a part of the linseed-oil appears on the surface, the remainder being retained in the body.

According to my experience, briquettes made after this process remain impervious to water though their surfaces be damaged. The linseed-oil which remained in the body of the briquette and the density of the latter obtained by the great pressure and sharp kiln-drying protect the briquettes against the dissolving influence of moisture and moist air. Experiments have also proved that ore briquettes made according to the before-described process will stand with certainty the high temperature of the reducing process without crumbling to pieces.

To obtain good results it is advisable to use molasses of the best quality.

Having fully described my invention, what I desire to claim and secure by Letters Patent is—

The process of manufacture of briquettes from ore, small coal, coal-dust, sawdust, &c., consisting in the moistening of the material with molasses mixed with linseed-oil, pressing of the mass under very high pressure, and kiln-drying of the molded pieces at a temperature of from 200° to 250° centigrade.

In testimony whereof I have signed my name to this specification in the presence of two subscribing witnesses.

JULIUS J. SALTERY.

Witnesses:
CHAPMAN COLEMAN,
FREDC. V. T. CROSBY.